(12) United States Patent
White et al.

(10) Patent No.: US 9,907,298 B2
(45) Date of Patent: Mar. 6, 2018

(54) FISH GIG

(71) Applicants: Joe White, Kinston, NC (US); Rebecca White, Kinston, NC (US)

(72) Inventors: Joe White, Kinston, NC (US); Rebecca White, Kinston, NC (US)

( * ) Notice: Subject to any disclaimer, the term of this patent is extended or adjusted under 35 U.S.C. 154(b) by 354 days.

(21) Appl. No.: 14/601,755

(22) Filed: Jan. 21, 2015

(65) Prior Publication Data
US 2016/0205906 A1 Jul. 21, 2016
US 2017/0258060 A9 Sep. 14, 2017

Related U.S. Application Data

(60) Provisional application No. 61/930,614, filed on Jan. 23, 2014.

(51) Int. Cl.
*A01K 81/04* (2006.01)
*A01K 81/06* (2006.01)

(52) U.S. Cl.
CPC .............. *A01K 81/04* (2013.01); *A01K 81/06* (2013.01)

(58) Field of Classification Search
CPC ................................ A01K 81/04; A01K 81/00
USPC ...................................... 43/6, 5; 294/61, 182
See application file for complete search history.

(56) References Cited

U.S. PATENT DOCUMENTS

| | | | | |
|---|---|---|---|---|
| 8,862 A * | 4/1852 | Stillman | ................ | A01K 81/00 43/6 |
| 64,045 A * | 4/1867 | Smith | .................... | A01K 81/00 43/6 |
| 362,183 A * | 5/1887 | Runyon | .................. | E02D 5/803 43/6 |
| 524,035 A * | 8/1894 | White | ....................... | B67B 7/12 294/128 |
| 554,764 A * | 2/1896 | Ackerson | ............... | A01K 81/00 43/6 |
| 784,747 A * | 3/1905 | Lobit | ..................... | A01K 81/00 43/6 |
| 806,019 A * | 11/1905 | Sullivan | .................. | B63B 21/12 294/61 |
| 1,076,036 A * | 10/1913 | Hepner et al. | ......... | A01K 81/00 294/125 |
| 1,113,465 A * | 10/1914 | Moller | ...................... | B67B 7/12 294/61 |
| 1,133,189 A * | 3/1915 | Shannon | .................... | F41B 5/12 43/6 |
| 1,183,399 A * | 5/1916 | Oakes | ..................... | A01K 97/14 294/61 |
| 1,234,794 A * | 7/1917 | Orson | ....................... | E01H 1/12 294/61 |
| 1,302,457 A * | 4/1919 | Ureck | .................... | A01K 81/00 43/5 |
| 1,334,206 A * | 3/1920 | Woods | ................... | A01K 81/00 43/6 |

(Continued)

FOREIGN PATENT DOCUMENTS

| | | | | | |
|---|---|---|---|---|---|
| FR | | 1115015 A | * | 4/1956 | ............. A01K 81/00 |
| JP | | 2002360122 A | * | 12/2002 | |
| WO | WO 2011005723 A2 | * | 1/2011 | ............. A01K 77/00 |

*Primary Examiner* — Darren W Ark
(74) *Attorney, Agent, or Firm* — Ward and Smith, P.A.; Ryan K. Simmons

(57) ABSTRACT

A fish gig is provided. The fish gig may include a retractable barb, wherein the retractable barb is operably connected to a handle configured for extending and retracting the retractable barb.

17 Claims, 3 Drawing Sheets

(56) References Cited

U.S. PATENT DOCUMENTS

| | | | | |
|---|---|---|---|---|
| 1,344,693 A | * | 6/1920 | Hinsdale | F42B 30/14 43/6 |
| 1,403,550 A | * | 1/1922 | Hinsdale | F42B 30/14 43/6 |
| 1,727,812 A | * | 9/1929 | David | A01K 81/00 43/6 |
| 1,832,727 A | * | 11/1931 | Nixon | A01K 87/00 124/26 |
| 1,913,810 A | * | 6/1933 | Lannes, Sr. | F42B 30/14 43/6 |
| 1,920,790 A | * | 8/1933 | Hendrie | F42B 30/14 43/5 |
| 2,118,147 A | * | 5/1938 | Blodgett | A01K 97/14 43/6 |
| 2,135,414 A | * | 11/1938 | Shores | F42B 30/14 43/6 |
| 2,194,016 A | * | 3/1940 | Geller | F41B 7/04 124/26 |
| 2,217,928 A | * | 10/1940 | Ward | A01K 83/00 43/43.16 |
| 2,289,284 A | * | 7/1942 | Chandler | F42B 6/08 473/584 |
| 2,404,249 A | * | 7/1946 | Potter | A01K 81/00 43/6 |
| 2,442,974 A | * | 6/1948 | Frederiksen | F42B 30/14 43/6 |
| 2,454,460 A | * | 11/1948 | Koepke | A01K 97/14 279/99 |
| 2,455,784 A | * | 12/1948 | Lapsensohn | A01K 81/00 42/105 |
| 2,598,230 A | * | 5/1952 | Dann | A01K 97/14 294/26 |
| 2,599,626 A | * | 6/1952 | Gottschalk | A01K 81/00 43/43.16 |
| 2,745,204 A | * | 5/1956 | Myers | F41B 13/10 43/1 |
| 2,758,405 A | * | 8/1956 | Hertel | A01K 81/00 43/6 |
| 2,789,388 A | * | 4/1957 | Freitas | A01K 81/00 43/43.16 |
| 2,789,856 A | * | 4/1957 | Russell | A01K 97/14 294/26 |
| 2,795,882 A | * | 6/1957 | Gaggioli | F41B 7/043 43/6 |
| 2,856,912 A | * | 10/1958 | Erickson | F41B 7/04 124/27 |
| 2,869,273 A | * | 1/1959 | Thorburn | F41B 7/04 124/27 |
| 2,951,306 A | * | 9/1960 | Woodfield | A01K 81/00 43/6 |
| 2,963,811 A | * | 12/1960 | Nelson | F42B 6/08 294/61 |
| 3,036,395 A | * | 5/1962 | Nelson | F42B 30/14 43/6 |
| 3,050,897 A | * | 8/1962 | Pitts | A01K 97/18 43/6 |
| 3,071,401 A | * | 1/1963 | Maierhofer | A01K 97/14 294/111 |
| 3,102,525 A | * | 9/1963 | Englis | F41B 11/83 124/31 |
| 3,138,383 A | * | 6/1964 | McKinzie | F42B 6/08 43/6 |
| 3,164,385 A | * | 1/1965 | Shure | F42B 6/08 473/582 |
| 3,216,141 A | * | 11/1965 | Walger | A01K 81/04 43/6 |
| 3,320,941 A | * | 5/1967 | Houghton | F41B 11/83 124/37 |
| 3,340,642 A | * | 9/1967 | Vasiljevic | F41B 7/04 102/504 |
| 3,600,835 A | * | 8/1971 | Hendricks | A01K 81/04 30/159 |
| 3,624,690 A | * | 11/1971 | Ashley | A01K 83/04 43/43.16 |
| 3,766,678 A | * | 10/1973 | Reaves | A01K 81/00 43/6 |
| 4,024,665 A | * | 5/1977 | Payne | A01K 81/00 43/6 |
| 4,043,067 A | * | 8/1977 | Konucik | A01K 81/04 43/6 |
| 4,209,929 A | * | 7/1980 | Mishima | A01K 81/04 43/6 |
| 4,642,929 A | * | 2/1987 | Franklin | A01K 81/00 43/6 |
| 4,685,239 A | * | 8/1987 | LaMonica | A01K 81/00 43/6 |
| 4,742,637 A | * | 5/1988 | Musacchia | A01K 81/00 43/6 |
| 4,807,382 A | * | 2/1989 | Albrecht | A01K 81/00 43/6 |
| 4,819,360 A | * | 4/1989 | Thomas | A01K 81/04 43/6 |
| 4,901,467 A | * | 2/1990 | Stolpe | F42B 6/08 43/6 |
| 4,924,619 A | * | 5/1990 | Dowell | A01K 81/04 124/79 |
| 4,982,523 A | * | 1/1991 | Garton | A01K 81/04 43/6 |
| 4,998,375 A | * | 3/1991 | Mitchell | A01K 83/00 43/43.16 |
| 5,570,530 A | * | 11/1996 | Lee | A01K 81/00 43/1 |
| 5,832,651 A | * | 11/1998 | Arntz | A01K 97/14 294/19.3 |
| 6,484,432 B1 | * | 11/2002 | Walger, Jr. | A01K 81/04 43/6 |
| 6,684,562 B1 | * | 2/2004 | Schade | A01K 15/003 119/803 |
| 6,766,609 B1 | * | 7/2004 | Aboczky | A01K 97/14 177/131 |
| 7,311,621 B2 | * | 12/2007 | Sullivan | F42B 6/08 473/583 |
| 7,571,564 B2 | * | 8/2009 | Sullivan | A01K 81/04 43/6 |
| 8,677,675 B2 | * | 3/2014 | Koch | A01K 81/04 43/6 |
| 8,887,434 B2 | * | 11/2014 | Waugh | A01K 77/00 43/6 |
| 9,121,676 B1 | * | 9/2015 | Coalson | F42B 6/08 |
| 9,146,085 B1 | * | 9/2015 | Braun | F42B 6/08 |
| 9,526,234 B2 | * | 12/2016 | Harshberger | A01K 81/00 |
| 9,723,820 B2 | * | 8/2017 | Harshberger | A01K 81/04 |
| 2008/0263932 A1 | * | 10/2008 | Butler | A01K 81/04 43/6 |
| 2015/0033610 A1 | * | 2/2015 | Waugh | A01K 77/00 43/6 |
| 2017/0172123 A1 | * | 6/2017 | Sullivan | F42B 6/08 |

\* cited by examiner

FISH GIG

RELATED APPLICATIONS

This application is related to and claims priority to U.S. Provisional Patent Application No. 61/930,614, filed on Jan. 23, 2014, entitled "Fish Gig."

FIELD OF THE INVENTION

The present invention is directed to a fish gig. Specifically, to a fish gig with a retractable barb, the fish gig preferably including a retractable barb that is capable of holding the fish securely on the gig and also being retractable for ease of removal.

BACKGROUND OF THE INVENTION

With a typical fish gig, after gigging a fish, e.g., a flounder, the fish often easily gets off the gig if the fish begins to thrash around while a fisherman is trying to land the fish. Traditional gigs have multiple spears (tines) with small barbs. After being speared the fish will often thrash around, creating enlarged holes through the fish, which can become larger than the barbs on the tines of the gig, and thus the fish then can often easily slip off the tines of the gig and be lost. In addition to the increased possibility of losing the fish, due to the multiple tines on a conventional gig, the fish, if lost or thrown back due to size regulations, is likely mortally wounded and will likely die. Further, for in those fish successfully gigged with a conventional gig, the meat is often damaged due to impalement by the multiple tines.

Thus, there is a need for a fish gig that securely holds the fish on the gig while the fisherman lands the fish, and while also allowing the fish to be easily removed from the gig by the fisherman once landed.

There is also a need for a fish gig that reduces the amount of damage caused to the flesh of the fish.

SUMMARY OF THE INVENTION

In one embodiment a fish gig is provided. The fish gig may include a retractable barb, wherein the retractable barb is operably connected to a handle configured for extending and retracting the retractable barb. The fish gig may further include a spear portion including a first end having a spear point, wherein the spear point has a first pointed end and a second end opposite the first pointed end, the second end including an attachment mechanism, wherein the retractable barb is pivotally attached thereto. The attachment mechanism may include a clevis fastener. The fish may further include a pole portion having a first end portion and a second end portion, wherein the spear portion is disposed at the first end portion. The pole portion may be at least partially hollow. The fish gig may further include a rod having a first end and a second end, the rod first end extending into the spear portion and the rod second end extending into the pole portion, wherein the rod is operably connected to the retractable barb at the rod first end. The rod may be operably connected to the retractable barb at the rod first end such that a downward movement of the rod and an upward movement of the rod causes the retractable barb to extend and retract respectively. The retractable barb may be substantially perpendicular to the spear portion when extended and substantially flush with the spear portion when retracted. The handle may be slideably attached to the pole portion, wherein the handle may be further connected to the rod second end and configured to extend and retract the retractable barb through slideable action of the handle. The handle may be rotateably attached to the pole portion, wherein the handle may be further connected to the rod second end and configured to extend and retract the retractable barb through rotateable action of the handle. The fish gig may further include a flange disposed about a periphery of the spear portion proximate to where the spear portion and pole portion meet. The fish gig may further include a handle grip disposed in a region of the pole portion above the handle. The fish gig may further include a connecting rod disposed between the rod first end and the retractable barb and configured to operably connect the rod to the retractable barb. The second end of the rod may be connected to the handle via a pin, wherein the pin preferably has a length greater than a diameter of the pole portion and extends through the rod second end and opposing walls of the pole portion, and wherein opposing ends of the pin engage the handle on corresponding opposing sides of the handle. The pole portion may further include slots disposed on opposing walls of the pole portion and configured to receive then ends of the pin and allow the pin to move up and down upon movement of the handle in an up and down direction respectively. The slots may be in the range of about one (1) inch in length. The retractable barb may be in the range of about 1½ inches long. The retractable barb may taper along its length. The retractable barb may be connected to the attachment mechanism and rod first end via pins. The spear portion may be at least partially hollow, and in the range of ten (10) inches in length and in the range of about ½ inches in diameter. The pole portion may be in the range of about six (6) feet to about ten (10) feet in length and in the range of about one (1) inch in diameter. The spear point may be in the range of about two (2) inches long extending from the spear portion second end and having a generally conical shape.

BRIEF DESCRIPTION OF THE DRAWINGS

Figure 1:
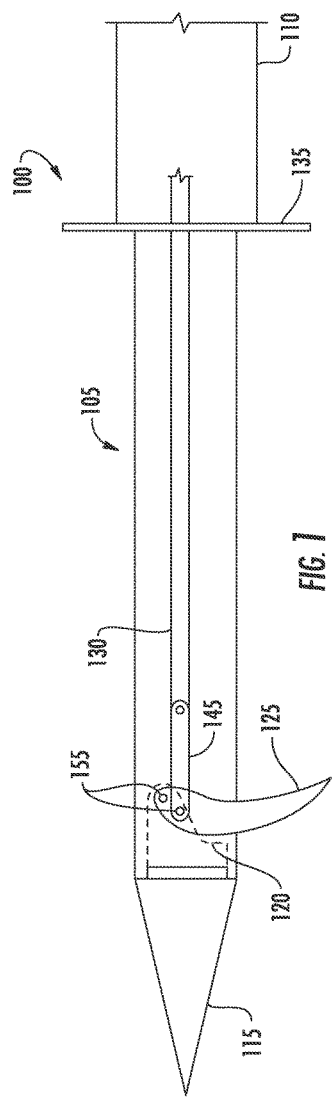

Having thus described the presently disclosed subject matter in general terms, reference will now be made to the accompanying Drawings, which are not necessarily drawn to scale, and wherein:

FIG. 1 illustrates a fish gig with a retractable barb in an extended position in accordance with an embodiment of the invention.

Figure 2:
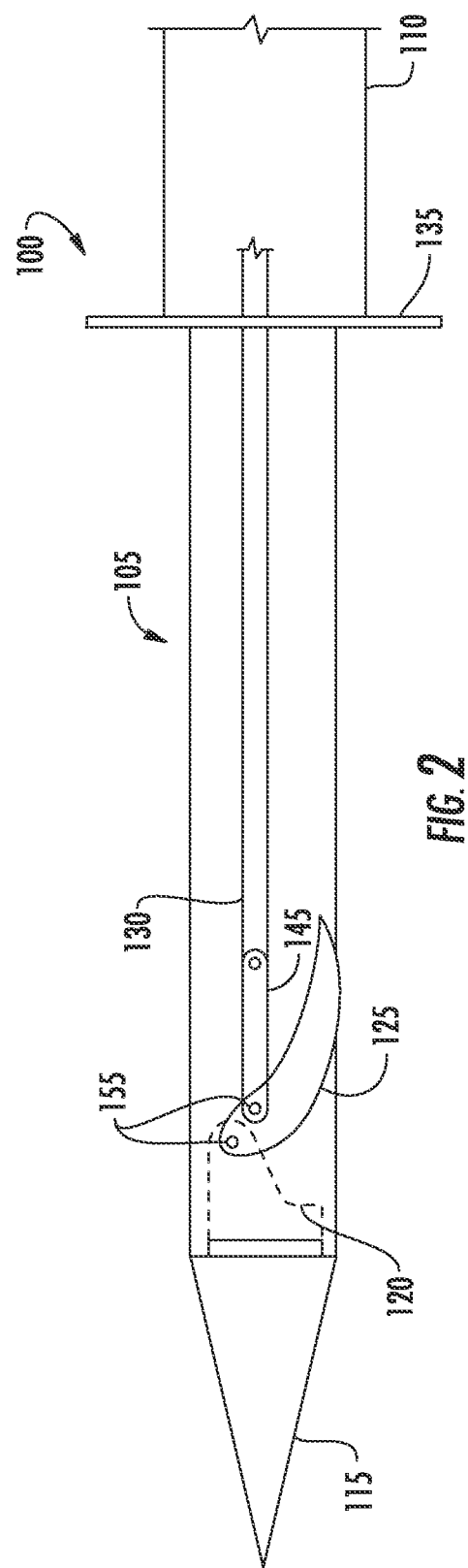

FIG. 2 illustrates the fish gig with the retractable barb in a retracted position in accordance with another embodiment of the invention.

Figure 3:
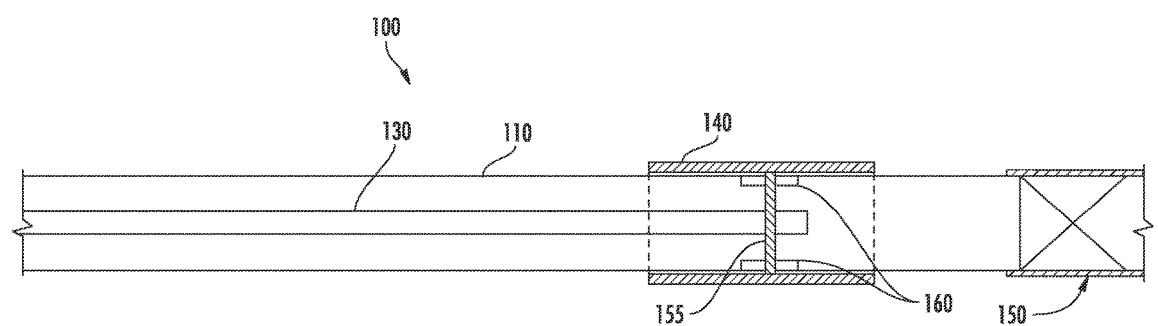

FIG. 3 illustrates a handle of the fish gig for operating the retractable barb in accordance with an embodiment of the invention.

DETAILED DESCRIPTION OF THE INVENTION

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof.

After gigging a fish, such as a flounder, the fish can easily become dislodged from the tines of a conventional gig, for example, once gigged the fish will often start to thrash around while the fisherman is trying to land the fish (e.g., lift the fish into a boat). This is problematic, as once the fish falls off, the fish is typically lost and since it has been gigged with a multi-tined gig most likely will die from the multiple impalements, and thus is wasted. The fish gig of the present invention solves this problem by employing a single tined fish gig with a retractable barb to keep the fish securely on the gig while landing the fish and that also makes removing the fish by the fisherman easier, and while also causing less damage to the fish as well.

Conventional fish gigs have multiple tines with small non-retractable barbs and do not truly secure a fish thereon once gigged. Typically, the fish becomes dislodged from the gig once gigged due to enlarged holes formed around the tines; this is a result of the fish thrashing about after being gigged. Also, the fish that do become dislodged and get away, or the ones under the size restrictions, have a less chance of survival due to the injuries sustained from being impaled by the multiple barbed tines of such a conventional gig. Further, fish that are successfully gigged with a conventional multi-tined gigged still incur increased damage to the meat of the fish due to impalement by the multiple tines. This may result in decreased usable meat and may make the meat less desirable for sale.

This present invention provides a single tined gig that includes a retractable barb that will hold the fish securely on the gig and allows for its easy removal from the gig by the fisherman.

With references to FIGS. 1-3, the invention preferably includes a fish gig 100 having a spear portion 105 formed or attached to one end of a pole 110. The spear portion 105 may further include a spear point 115 formed or attached at a lower end of spear portion 105 opposite pole 110. Spear point 115 may have a clevis 120 formed or attached to an upper portion of spear point 115 that is opposite to the pointed portion of spear point 115. Clevis 120 may be further connected to a retractable barb 125. Retractable barb 125 may be mounted to clevis 120 such that it is capable of pivoting about its point of attachment. Retractable barb 125 may be additionally attached to a lower end of a rod 130. Positioned between spear portion 105 and pole 110 may be a flange 135. In one example flange 135 may include stop washer. Pole 110 may be hollow or partially hollow and may include rod 130 housed therein, wherein rod 130 preferably extends into spear portion 105. Rod 130 may attach to a handle 140 of pole 110 at its proximal end and to retractable barb 125 at its distal end. In one embodiment, rod 130 may further include a connecting rod 145, wherein connecting rod 145 is positioned between the distal end of rod 130 and retractable barb 125, and is configured to connect rod 130 with retractable barb 125. Pole 110 may further include a handle grip 150 that is preferably attached or formed on the outside of pole 110 at an upper portion thereof, opposite of that of spear portion 105. Handle 140 may be a slideable or rotateable about pole 110, or other suitable configuration to allow for extending and retracting retractable barb 125.

Spear portion 105, in one example, may be generally hollow and in the range of about 10 inches long and in the range of about ½ inches in diameter. Spear portion 105, in one example, may be made of stainless steel or any other suitable marine durable material. Pole 110, in one example, may be in the range of about 6 feet to about 10 feet, and in the range of about 1 inch in diameter. Pole 110, in one example, maybe made of aluminum, PVC, stainless steel, or any other suitable marine durable material. Spear point 115, in one example, may be in the range of about 2 inches long having a generally conical shape and may be made of stainless steel or other suitable marine durable material, and may be solid, partially hollow, or substantially hollow. Clevis 120, in one example, is a standard clevis and may be made of stainless steel or other suitable marine durable material. Retractable barb 125, in one example, may be in the range of about 1½ inches long and in the range of about ⅛ inch wide, and may be made of stainless steel or other suitable marine durable material. Retractable barb 125, in one example, may taper from about ⅛th of an inch wide at its connection point to clevis 120 down to its most narrowed point at its opposite end point. Rod 130 may be in the range of about 4 feet to about 8 feet (or other suitable length depending on the length of pole 110 and spear portion 105) and in the range of about ¼ inch in diameter. Rod 130 may be made of stainless steel or other suitable marine durable material. In an embodiment including connecting rod 145, connecting rod 145 may be in the range of about 2 inches in length and in the range of about ¼ inch wide (or diameter) and made of stainless steel or other suitable marine durable material. Flange 135, may be in the range of about a 3 inches in diameter and may be made of stainless steel, hard rubber, or other suitable marine durable material. In one example, flange 135 may be a stop washer. Handle 140 and handle grip 150 may be in the range of about 5 inches to about 6 inches long with about a 1 inch inner diameter and 1½ inch outer diameter, and made of PVC, stainless steel, or other suitable marine durable material. Handle 140 and handle grip 150 may further include a padding or grip material around their outer perimeters, for example a foam, rubber, or other suitable marine durable material. Further, the example dimensions listed above are examples only and dimensions less than or greater than those listed above are within the scope of the present invention. Further, various elements of the present invention (e.g., clevis 120, flange 135) may include, or be replaced by, elements not listed that are capable of performing the same function.

In one embodiment, retractable barb 125 is pivotally attached to clevis 120 with an attachment pin 155 or other suitable attachment mechanism, and attachment pin 155 may be made of stainless steel or other suitable marine durable material. Retractable barb 125, in one example, may be positioned between two arms of clevis 120. The distal end of rod 130 may be connected to retractable barb 125 with a similar type attachment pin 155 as noted above with regard to the retractable barb. Retractable barb 125 is attached to clevis 120 and rod 130 in such a way that when rod 130 is moved in the downward direction (e.g., toward spear point 115) retractable barb 125 extends to its extended position (extending in the range of about ¾ of an inch to about 1 inch out from spear portion 105), and when rod 130 is moved in an upward direction (e.g., toward handle grip 150) retractable barb 125 moves to its retracted position. In an embodiment including connecting rod 145, instead of rod 130 connecting directly with retractable barb 125, rod 130 may instead connect to an upper end of connecting rod 145, e.g., with an attachment pin 155. A lower end of connecting rod 145 may be connected to retractable barb 125, e.g., with an attachment pin 155. In this embodiment, connecting rod 145 is disposed between the distal end of rod 130 and retractable barb 125, and connects the two together.

Rod 130 may be further attached, at its proximal end, to handle 140 with a similar type attachment pin 155, which extends through handle 140 and rod 130 to connect rod 130 to handle 140 and to also hold rod 130 in position. In one embodiment attachment pin 155 connecting rod 130 to handle 140 may be in the range of about 1½ inches long and in the range of about ⅛ of an inch in diameter and having its ends positioned in slide slots 160. Slide slots 160 may be formed opposite each other in the walls of pole 110 and are configured to allow handle 140 to move up and down, wherein the ends of pin 155, connecting rod 130 to handle 140, extend through pole 110 and its ends are preferably substantially flush with the outer surface of slide handle 140. Slide slots 160 may be in the range of about 1 inch long Handle grip 150 maybe attached to pole 110 at an upper portion thereof in a direction opposite spear portion 105 and preferably in the range of about 18 inches above handle 140.

In operation, a fisherman, with retractable barb 125 in its retracted position, may gig a fish with spear point 115 of spear portion 105 impaling the fish to a point past retractable barb 125. Amongst other things, flange 135 may also function to prevent the speared fish from sliding past spear portion 105 and up pole 110. Once speared, the fishermen may then slide handle 140 in a downward direction, which causes rod 130 to move in a downward direction and thus. The downward movement of rod 130 causes retractable barb 125, which is connected to rod 130, to pivot about its attachment point to clevis 120 and to extend to its open position at a point below the fish, thus securing the fish onto fish gig 100. In one embodiment, in its open position retractable barb 125 extends in the range of about ¾ of an inch to about 1 inch out from spear portion 105 and is substantially perpendicular to spear portion 105. To remove the speared fish, the fisherman slides handle 140 in an upward direction, which operates to retract retractable barb 125 to its closed position via the upward motion of rod 130, such that retractable barb 125 is substantially flush with the outer surface of spear portion 105 and therefor allows the fish to easily slide off spear portion 105 and thus removed from fish gig 100. In another embodiment, having a rotateable handle 140, the fisherman rotates handle 140 in a clockwise or counterclockwise direction, which operates to retract/extend retractable barb 125.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

We claim:

1. A fish gig comprising:
  a. a pole having a first end portion and a second end portion;
  b. a spear portion disposed at the first end portion of the pole, the spear portion comprising a first end having a spear point, the spear point having a first pointed end and a second end opposite the first pointed end, the second end comprising an attachment mechanism;
  c. a retractable barb pivotally attached to the attachment mechanism, wherein the retractable barb is further operably connected to a handle configured for extending and retracting the retractable barb, and wherein the handle is slideably attached to the pole such that the handle slides up and down along an outer surface of the pole, the handle being configured to extend and retract the retractable barb through slideable action of the handle; and
  d. a rod having a first end and a second end, the rod being operably connected to the retractable barb at the rod first end and operably connected to the handle at the rod second end, wherein the rod connects to the handle via a pin, and wherein the pin has a length greater than a diameter of the pole and extends through the rod second end and opposing walls of the pole, and wherein opposing ends of the pin engage the handle on corresponding opposing sides of the handle.

2. The fish gig of claim 1 wherein the attachment mechanism comprises a clevis fastener.

3. The fish gig of claim 1 wherein the pole is at least partially hollow.

4. The fish gig of claim 3 further comprising a connecting rod disposed between the rod first end and the retractable barb and configured to operably connect the rod to the retractable barb.

5. The fish gig of claim 1 wherein a downward movement of the rod and an upward movement of the rod causes the retractable barb to extend and retract respectively.

6. The fish gig of claim 5 wherein the retractable barb is substantially perpendicular to the spear portion when extended and substantially flush with the spear portion when retracted.

7. The fish gig of claim 1 further comprising a flange disposed about a periphery of the spear portion proximate to where the spear portion and pole meet.

8. The fish gig of claim 1 further comprising a handle grip disposed at the second end portion of the pole above the handle.

9. The fish gig of claim 1 wherein the pole further comprises slots disposed through the opposing walls of the pole and configured to allow the pin to move up and down upon movement of the handle in up and down directions respectively.

10. The fish gig of claim 9 wherein the slots are about one inch in length.

11. The fish gig of claim 1 wherein the retractable barb is about 1½ inches long.

12. The fish gig of claim 11 wherein the retractable barb tapers along its length.

13. The fish gig of claim 1 wherein the retractable barb is connected to the attachment mechanism and rod first end via pins.

14. The fish gig of claim 1 wherein the spear portion is at least partially hollow, and about ten inches in length and about ½ inch in diameter.

15. The fish gig of claim 1 wherein the pole is in a range of about six feet to about ten feet in length and about one inch in diameter.

16. The fish gig of claim 1 wherein the spear point is about two inches long extending from the spear point second end to the first pointed end and having a generally conical shape.

17. A fish gig comprising:
a. a pole having a first end portion and a second end portion;
b. a spear portion disposed at the first end portion of the pole, the spear portion comprising a first end having a spear point, the spear point having a first pointed end and a second end opposite the first pointed end, the second end comprising an attachment mechanism;
c. a retractable barb pivotally attached to the attachment mechanism, wherein the retractable barb is operably connected to a handle by a rod, wherein the handle is further slideably attached to the pole; and wherein the rod comprises a first end and a second end, the rod first end extending into the spear portion and the rod second end extending into the pole, wherein the rod is operably connected to the retractable barb at the rod first end and operably connected to the handle at the rod second end, wherein the handle is connected to the rod second end via a pin and configured to extend and retract the retractable barb through slideable action of the handle, and wherein the pin has a length greater than a diameter of the pole and extends through the rod second end and opposing walls of the pole, and wherein opposing ends of the pin engage the handle on corresponding opposing sides of the handle.

* * * * *